US012279040B2

(12) United States Patent
Lan (10) Patent No.: US 12,279,040 B2
(45) Date of Patent: Apr. 15, 2025

(54) MOBILE TERMINAL HAVING DETACHABLY CONNECTED CAMERA MODULE, HALL SENSOR, AND MAGNET, SHOOTING MODE DETECTION METHOD, AND STORAGE MEDIUM (71) Applicant: VIVO MOBILE COMMUNICATION CO., LTD., Dongguan (CN)

(72) Inventor: Yongcheng Lan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 202 days.

(21) Appl. No.: 17/870,779

(22) Filed: Jul. 21, 2022

(65) Prior Publication Data
US 2022/0360709 A1 Nov. 10, 2022

Related U.S. Application Data (63) Continuation of application No. PCT/CN2021/072902, filed on Jan. 20, 2021.

(30) Foreign Application Priority Data

Jan. 22, 2020 (CN) .......................... 202010073817.7

(51) Int. Cl.
*H04N 23/667* (2023.01)
*G01V 3/08* (2006.01)
(Continued)

(52) U.S. Cl.
CPC ........... *H04N 23/667* (2023.01); *G01V 3/081* (2013.01); *H04M 1/0264* (2013.01);
(Continued)

(58) Field of Classification Search
CPC ...... H04N 23/667; H04N 23/45; H04N 23/50; H04N 23/51; H04N 23/531; H04N 23/54;
(Continued)

(56) References Cited

U.S. PATENT DOCUMENTS 11,048,346 B1 * 6/2021 Burks .................. G06F 1/1616
2006/0233545 A1 * 10/2006 Senba .................... H04N 23/66
396/529

FOREIGN PATENT DOCUMENTS

CN 103475782 A 12/2013
CN 104320591 A 1/2015
(Continued)

OTHER PUBLICATIONS

International Search Report issued in corresponding International Application No. PCT/CN2021/072902, mailed Mar. 17, 2021, 5 pages.
(Continued)

*Primary Examiner* — Timothy J Henn
*Assistant Examiner* — Akshay Trehan
(74) *Attorney, Agent, or Firm* — IPX PLLC (57) ABSTRACT A mobile terminal, a shooting mode detection method, and a storage medium are provided. The mobile terminal includes a terminal body which has a placement portion for placing a camera module. The mobile terminal further includes the camera module detachably connected to the terminal body. The mobile terminal also includes a first Hall sensor and a second Hall sensor. The first Hall sensor and the second Hall sensor are respectively electrically connected to a processor built in the terminal body and fixedly arranged on a side on which the placement portion of the terminal body is located. The mobile terminal additionally includes a magnetic structural element which is fixed on an end of the camera module close to the placement portion. When the camera module is placed on the placement portion, the magnetic structural element is opposite to the first Hall sensor or the second Hall sensor.

10 Claims, 4 Drawing Sheets (51) Int. Cl.
*G03B 17/56* (2021.01)
*H04M 1/02* (2006.01)
*H04M 1/72454* (2021.01)
*H04N 23/45* (2023.01)
*H04N 23/50* (2023.01)
*H04N 23/54* (2023.01)
*H04N 23/57* (2023.01)
*H04N 23/60* (2023.01)
*H04N 23/663* (2023.01)

(52) U.S. Cl.
CPC ............. *H04N 23/45* (2023.01); *H04N 23/50* (2023.01); *H04N 23/54* (2023.01); *H04N 23/57* (2023.01); *H04N 23/64* (2023.01); *H04N 23/663* (2023.01); *G03B 17/561* (2013.01); *G03B 17/566* (2013.01); *H04M 1/0256* (2013.01); *H04M 1/72454* (2021.01)

(58) Field of Classification Search
CPC ...... H04N 23/57; H04N 23/64; H04N 23/663; G01V 3/081; G03B 17/561; G03B 17/566; G03B 17/14; H04M 1/0256; H04M 1/0264; H04M 1/72454; G06F 1/1686; G06F 1/1607
See application file for complete search history.

(56) References Cited

FOREIGN PATENT DOCUMENTS

| | | | |
|---|---|---|---|
| CN | 104618634 A | 5/2015 | |
| CN | 106453694 A | 2/2017 | |
| CN | 106790778 A | 5/2017 | |
| CN | 107613185 A | 1/2018 | |
| CN | 107819907 A | 3/2018 | |
| CN | 108924282 A | 11/2018 | |
| CN | 109951702 A | 6/2019 | |
| CN | 110581938 A | 12/2019 | |
| CN | 110581952 A | 12/2019 | |
| CN | 110620830 A | 12/2019 | |
| CN | 111246061 A | 6/2020 | |
| JP | 2006295838 A | 10/2006 | |
| KR | 20160085553 A | * 7/2016 | ......... H04M 1/0264 |
| KR | 20190021550 A | 3/2019 | |

OTHER PUBLICATIONS

First Office Action issued in related Chinese Application No. 202010073817.7, mailed Dec. 22, 2020, 10 pages.
Extended European Search Report issued in related European Application No. 21744020.5, mailed Jul. 7, 2023, 10 pages.

* cited by examiner

MOBILE TERMINAL HAVING DETACHABLY CONNECTED CAMERA MODULE, HALL SENSOR, AND MAGNET, SHOOTING MODE DETECTION METHOD, AND STORAGE MEDIUM

CROSS-REFERENCE TO RELATED APPLICATIONS

This application is a continuation of International Application No. PCT/CN2021/072902, filed on Jan. 20, 2021, which claims priority to Chinese Patent Application No. 202010073817.7 filed in China on Jan. 22, 2020. The entire contents of each of the above-referenced applications are expressly incorporated herein by reference.

TECHNICAL FIELD

The present disclosure relates to the field of communication technologies, and in particular, to a mobile terminal, a shooting mode detection method, and a storage medium.

BACKGROUND

With the development of wireless transmission technologies, mobile terminals have become indispensable in people's life. To reduce space occupied by a camera module in a mobile terminal to provide more space for the entire industrial design of the mobile terminal, the concept of detachable camera comes into being. A detachable camera means that a mobile terminal is only equipped with one detachable camera module that can work independently, to perform original camera rear-facing shooting and front-facing shooting functions.

Since shooting parameters of camera front-facing shooting and rear-facing shooting are different, to ensure normal operation of a camera module, it is necessary to detect whether a shooting mode of the camera module is front-facing shooting or rear-facing shooting. In the related art, a special detection apparatus is usually added in a mobile terminal to identify a shooting mode of the camera module. However, this method usually requires additional modification (such as digging a hole or reserving a contact point) of the appearance of the mobile terminal, to install the detection apparatus.

SUMMARY

Embodiments of the present disclosure provide a mobile terminal, a shooting mode detection method, and a storage medium, which can detect a shooting mode of a mobile terminal having a detachable camera module.

The embodiments of the present disclosure adopt the following technical solutions:

According to a first aspect, a mobile terminal is provided, including:

a terminal body, where the terminal body has a placement portion where a camera module can be placed;

the camera module detachably connected to the terminal body;

a first Hall sensor and a second Hall sensor, where the first Hall sensor and the second Hall sensor are respectively electrically connected to a processor built in the terminal body and fixedly arranged on a side on which the placement portion of the terminal body is located; and a magnetic structural element, where the magnetic structural element is fixed on an end of the camera module close to the placement portion, and when the camera module is placed on the placement portion, the magnetic structural element is opposite to the first Hall sensor or the second Hall sensor.

According to a second aspect, a shooting mode detection method is provided, applied to the mobile terminal according to the first aspect, where the method includes:

acquiring a first magnetic field strength signal output by the first Hall sensor and a second magnetic field strength signal output by the second Hall sensor; and determining a shooting mode of the camera module according to the first magnetic field strength signal and the second magnetic field strength signal, where the shooting mode includes a front-facing shooting mode or a rear-facing shooting mode.

According to a third aspect, a mobile terminal is provided, where the mobile terminal is the mobile terminal according to the first aspect, and includes:

an acquisition module, configured to acquire a first magnetic field strength signal output by the first Hall sensor and a second magnetic field strength signal output by the second Hall sensor; and a determining module, configured to determine a shooting mode of the camera module according to the first magnetic field strength signal and the second magnetic field strength signal, where the shooting mode includes a front-facing shooting mode or a rear-facing shooting mode.

According to a fourth aspect, a mobile terminal is provided, and includes: a memory, a processor, and a computer program stored in the memory and executable on the processor, where when the computer program is executed by the processor, steps in the method according to the second aspect are implemented.

According to a fifth aspect, a computer-readable storage medium is provided, where the computer-readable storage medium stores a computer program, and when the computer program is executed by a processor, steps of the method according to the second aspect are implemented.

In the embodiments of the present disclosure, since the magnetic structural element is disposed on the camera module that is detachable from the terminal body, and is opposite to only one of the Hall sensors when the camera module is placed on the placement portion, when the camera module is placed on the placement portion of the terminal body in different manners, Hall sensors opposite to the magnetic structural element are different. Therefore, magnetic field strengths of the magnetic structural element detected by the first Hall sensor and the second Hall sensor are different. Thus, in practical applications, the magnetic field strengths detected by the first Hall sensor and the second Hall sensor can be used to determine the Hall sensor opposite to the magnetic structural element. Since the camera module has a front-facing shooting mode and a rear-facing shooting mode, and the Hall sensors opposite to the magnetic structural element are different in different shooting modes, the processor built in the terminal body can determine the shooting mode of the camera module based on magnetic field strength signals output by the first Hall sensor and the second Hall sensor. That is, in the mobile terminal of the embodiments of the present disclosure, the shooting mode of the camera module can be determined only by disposing the Hall sensors and the magnetic structural element, the determining logic is simple, and costs are low. Besides, the appearance of the mobile terminal does not need to be additionally modified, and the appearance aesthetics of the mobile terminal can be preserved.

BRIEF DESCRIPTION OF DRAWINGS

The accompanying drawings described herein are used to provide further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings.

DETAILED DESCRIPTION

The following describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The following describes the technical solutions in various embodiments of the present disclosure in detail with reference to the accompanying drawings.

Figure 1:
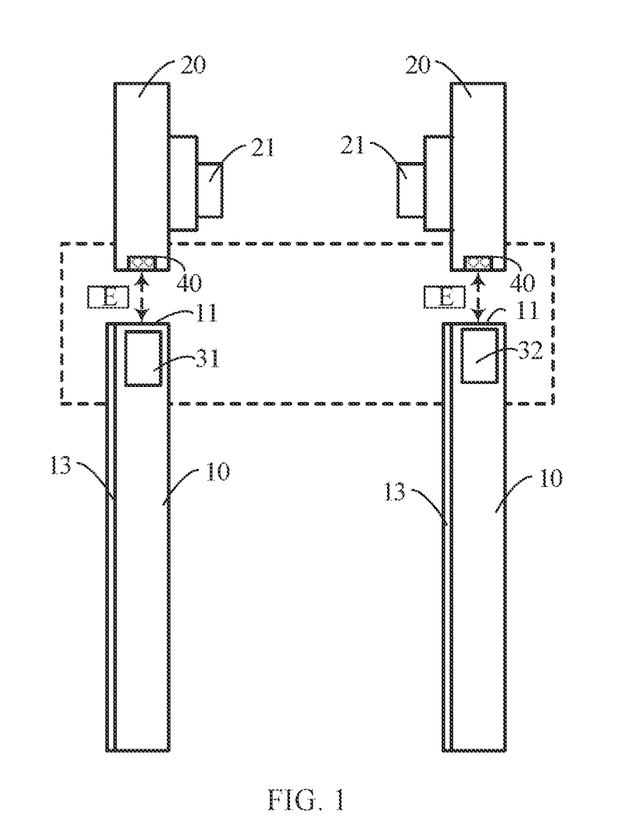
FIG. 1 is a side view of a mobile terminal according to an embodiment of the present disclosure.
Figure 2:
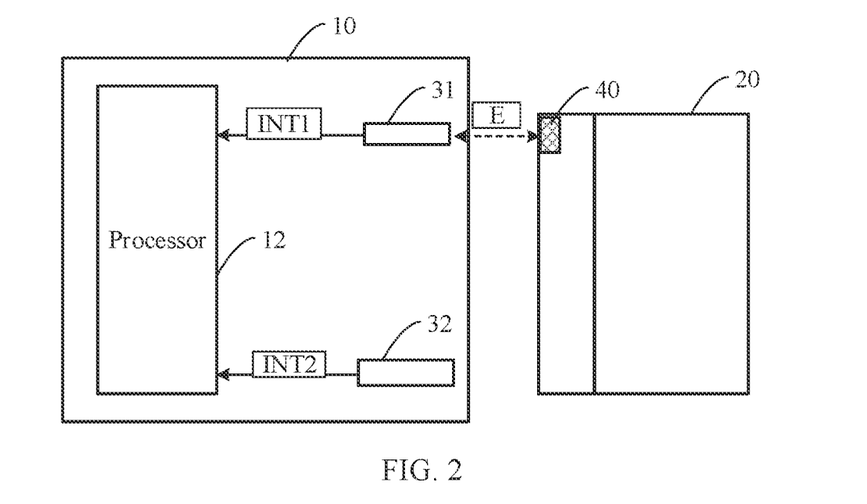
FIG. 2 is a top view of a mobile terminal according to an embodiment of the present disclosure, where a shooting mode of a camera module is a rear-facing shooting mode.
Figure 3:
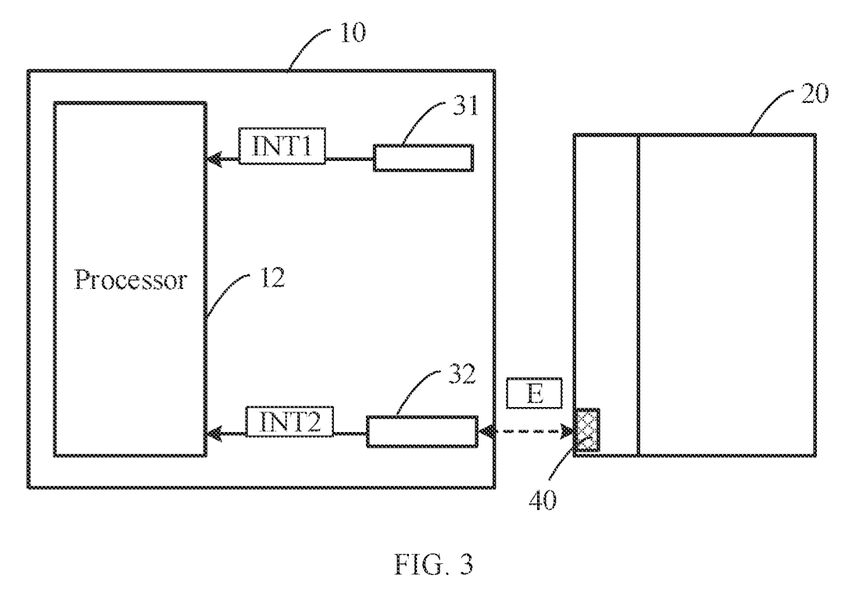
FIG. 3 is a top view of a mobile terminal according to an embodiment of the present disclosure, where a shooting mode of a camera module is a front-facing shooting mode.

Referring to FIG. 1 to FIG. 3, an embodiment of the present disclosure provides a mobile terminal. The mobile terminal may specifically include: a terminal body 10, a camera module 20 detachably connected to the terminal body 10, a first Hall sensor 31, a second Hall sensor 32, and a magnetic structural element 40.

The terminal body 10 has a placement portion 11 where the camera module 20 can be placed, and the terminal body 10 has a built-in processor 12.

The first Hall sensor 31 and the second Hall sensor 32 are respectively electrically connected to the processor 12 built in the terminal body 10 and fixedly arranged on a side on which the placement portion 11 of the terminal body 10 is located.

The magnetic structural element 40 is fixed on an end of the camera module 20 close to the placement portion 11, and when the camera module 20 is placed on the placement portion 11, the magnetic structural element 40 is opposite to the first Hall sensor 31 or the second Hall sensor 32. For example, the magnetic structural element 40 may be a magnet.

In the embodiments of the present disclosure, since the magnetic structural element 40 is disposed on the camera module 20 that is detachable from the terminal body 10, and is opposite to only one of the Hall sensors when the camera module 20 is placed on the placement portion 11, when the camera module 20 is placed on the placement portion 11 of the terminal body 10 in different manners, Hall sensors opposite to the magnetic structural element 40 are different. Therefore, magnetic field strengths of the magnetic structural element detected by the first Hall sensor 31 and the second Hall sensor 32 are different.

Thus, in practical applications, the magnetic field strengths detected by the first Hall sensor 31 and the second Hall sensor 32 can be used to determine the Hall sensor opposite to the magnetic structural element. Since the camera module 20 has a front-facing shooting mode and a rear-facing shooting mode, and the Hall sensors opposite to the magnetic structural element 40 are different in different shooting modes, the processor 12 built in the terminal body 10 can determine the shooting mode of the camera module 20 based on a magnetic field strength signal output by the first Hall sensor 31 and a magnetic field strength signal output by the second Hall sensor 32. That is, in the mobile terminal of the embodiments of the present disclosure, the shooting mode of the camera module can be determined only by disposing the Hall sensors and the magnetic structural element, the determining logic is simple, and costs are low. Besides, the appearance of the mobile terminal does not need to be additionally modified, and the appearance aesthetics of the mobile terminal can be preserved.

In this embodiment of the present disclosure, the terminal body 10 further includes a display screen 13, and the camera module 20 includes a camera 21. As shown in FIG. 1, in the rear-facing shooting mode, the orientation of the camera 21 is contrary to the orientation of the display screen 13. In the front-facing shooting mode, the orientation of the camera 21 is the same as the orientation of the display screen 13. As shown in FIG. 1 and FIG. 2, the camera module 20 is placed on the placement portion 11, and when the orientation of the camera 21 is contrary to the orientation of the display screen 13, the magnetic structural element 40 is opposite to the first Hall sensor 31. As shown in FIG. 1 and FIG. 3, when the orientation of the camera 21 is the same as the orientation of the display screen 13, the magnetic structural element 40 is opposite to the second Hall sensor 32.

Since the orientations of the camera 21 relative to the display screen 13 are different, and the Hall sensors opposite to the magnetic structural element 40 are different when the camera module 20 is in different shooting modes, the Hall sensor opposite to the magnetic structural element 40 detects a higher magnetic field strength, while the other Hall sensor detects a lower magnetic field strength. Correspondingly, the first Hall sensor 31 and the second Hall sensor 32 output corresponding magnetic field strength signals to the processor 12 based on detected magnetic field strengths of the magnetic structural element 40. The processor 12 can acquire the first magnetic field strength signal output by the first Hall sensor 31 and the second magnetic field strength signal output by the second Hall sensor 32, and determine the shooting mode of the camera module 20 according to the first magnetic field strength signal and the second magnetic field strength signal.

FIG. 1 to FIG. 3 are used as an example. When the camera module 20 is far away from the terminal body 10, the first Hall sensor 31 and the second Hall sensor 32 respectively detect that the magnetic field strength E of the magnetic structural element 40 is relatively small. In this case, the first magnetic field strength signal INT1 output by the first Hall sensor 31 and the second magnetic field strength signal INT2 output by the second Hall sensor 32 are both a first level signal.

As shown in FIG. 1 and FIG. 2, when the camera module 20 approaches the terminal body 10, if the orientation of the camera 21 is contrary to the orientation of the display screen 13, a distance between the magnetic structural element 40 and the first Hall sensor 31 decreases. The first Hall sensor 31 detects that the magnetic field strength of the magnetic structural element 40 increases, and when the magnetic field strength E reaches a field strength triggering threshold EO of the first Hall sensor 31, the first magnetic field strength signal INT1 output by the first Hall sensor 31 is a second level signal. In this case, the second Hall sensor 32 detects that the magnetic field strength E of the magnetic structural element 40 is small, and the outputted second magnetic field strength signal INT2 is still the first level signal.

As shown in FIG. 1 and FIG. 3, if the orientation of the camera 21 is the same as the orientation of the display screen 13, a distance between the magnetic structural element 40 and the second Hall sensor 32 decreases. The second Hall sensor 32 detects that the magnetic field strength E of the magnetic structural element 40 increases, and when the magnetic field strength E reaches a field strength triggering threshold EO of the second Hall sensor 32, the second magnetic field strength signal INT2 output by the second Hall sensor 32 is a second level signal. In this case, the first Hall sensor 31 detects that the magnetic field strength E of the magnetic structural element 40 is small, and the outputted first magnetic field strength signal INT1 is still the first level signal. The first level signal and the second level signal are different level signals, when the first level signal is a high level signal, the second level signal is a low level signal, and when the first level signal is a low level signal, the second level signal is a high level signal.

Correspondingly, the processor 12 can determine the shooting mode of the camera module 20 according to the first magnetic field strength signal output by the first Hall sensor 31 and the second magnetic field strength signal output by the second Hall sensor 32. Specifically, the processor 12 is specifically configured to: in a case that the first magnetic field strength signal is a first level signal and the second magnetic field strength signal is a second level signal, determine that the shooting mode of the camera module 20 is the front-facing shooting mode; and in a case that the first magnetic field strength signal is a second level signal and the second magnetic field strength signal is a first level signal, determine that the shooting mode of the camera module 20 is the rear-facing shooting mode.

In the embodiments of the present disclosure, the processor 12 determines the shooting mode of the camera module 20 only based on the first magnetic field strength signal output by the first Hall sensor 31 and the second magnetic field strength signal output by the second Hall sensor 32, the determining logic is simple, and costs are low. Besides, the appearance of the mobile terminal does not need to be additionally modified, and the appearance aesthetics of the mobile terminal can be preserved.

Further, in the embodiments of the present disclosure, the processor 12 may also be configured to disable the shooting function of the mobile terminal in a case that the first magnetic field strength signal output by the first Hall sensor 31 and the second magnetic field strength signal output by the second Hall sensor 32 are both the first level signal.

Still referring to FIG. 1 to FIG. 3, in a process in which the camera module 20 moves away from the terminal body 10, the magnetic structural element 40 is farther and farther away from the first Hall sensor 31 and the second Hall sensor 32, and the first Hall sensor 31 and the second Hall sensor 32 both detect that the magnetic field strength of the magnetic structural element 40 decreases. Therefore, the first magnetic field strength signal output by the first Hall sensor 31 and the second magnetic field strength signal output by the second Hall sensor 32 are both the first level signal. Based on this, when the processor 12 obtains that the first magnetic field strength signal output by the first Hall sensor 31 and the second magnetic field strength signal output by the second Hall sensor 32 are both the first level signal, the processor 12 can determine that the camera module 20 is detached from the terminal body 10. In this case, by disabling the shooting function of the mobile terminal, power consumption and system resource occupation of the mobile terminal caused by the camera module can be reduced, and the battery life of the mobile terminal can be increased.

Further, in the embodiments of the present disclosure, after determining the shooting mode of the camera module 20, the processor 12 may be further configured to adjust a shooting parameter of the camera module 20 according to the shooting mode. The shooting parameter may, for example, include but is not limited to at least one of the following: a shooting speed, a resolution, a focal length, an angle of view, and the like.

Thus, the processor 12 of the mobile terminal adjusts the shooting parameter of the camera module 20 based on the shooting mode of the camera module 20, which can improve the shooting quality and shooting efficiency of the camera module in the corresponding shooting mode.

In the embodiments of the present disclosure, as shown in FIG. 2 and FIG. 3, to improve the accuracy of determining the shooting mode of the camera module, the first Hall sensor 31 and the second Hall sensor 32 may be symmetrically distributed on two sides relative to the center line of the terminal body 10. Therefore, by separating the first Hall sensor 31 from the second Hall sensor 32, it can be avoided that the difference between the magnetic field strength signals output by the first Hall sensor 31 and the second Hall sensor 32 is small because the first Hall sensor 31 and the second Hall sensor 32 are close to each other. Therefore, based on the first magnetic field strength signal output by the first Hall sensor 31 and the second magnetic field strength signal output by the second Hall sensor 32, it can be effectively and accurately identified whether the shooting mode of the camera module 20 is the front-facing shooting mode or the rear-facing shooting mode.

Figure 4:
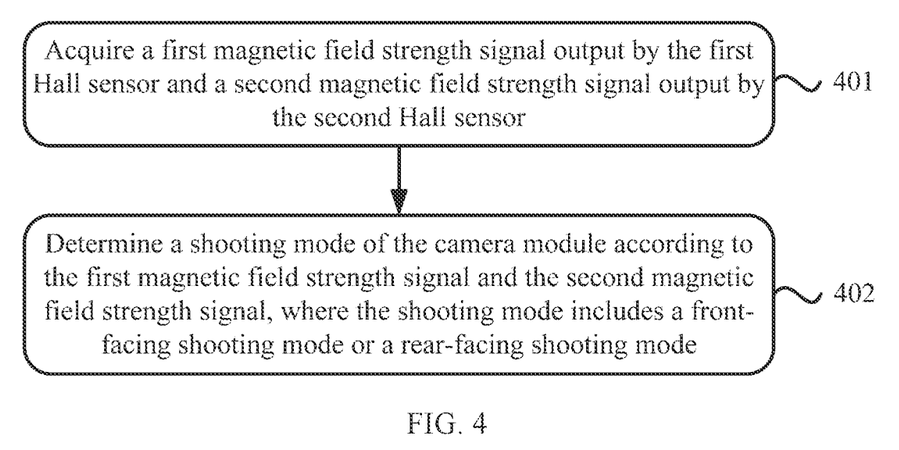
FIG. 4 is a flowchart of a shooting mode detection method according to an embodiment of the present disclosure.

Referring to FIG. 4, an embodiment of the present disclosure provides a shooting mode detection method. The method can be applied to the mobile terminal described in the foregoing embodiments of the present disclosure. Specifically, the method may include:

Step 401: Acquire a first magnetic field strength signal output by the first Hall sensor and a second magnetic field strength signal output by the second Hall sensor.

Step 402: Determine a shooting mode of the camera module according to the first magnetic field strength signal and the second magnetic field strength signal, where the shooting mode includes a front-facing shooting mode or a rear-facing shooting mode.

In the embodiments of the present disclosure, since the magnetic structural element is disposed on the camera module that is detachable from the terminal body, and is opposite to only one of the Hall sensors when the camera module is placed on the placement portion, when the camera module is placed on the placement portion of the terminal body in different manners, Hall sensors opposite to the magnetic structural element are different. Therefore, magnetic field strengths of the magnetic structural element detected by the first Hall sensor and the second Hall sensor are different. Thus, in practical applications, the magnetic field strengths detected by the first Hall sensor and the second Hall sensor can be used to determine the Hall sensor opposite to the magnetic structural element. Since the camera module has a front-facing shooting mode and a rear-facing shooting mode, and the Hall sensors opposite to the magnetic structural element are different in different shooting modes, the processor built in the terminal body can determine the shooting mode of the camera module based on magnetic field strength signals output by the first Hall sensor and the second Hall sensor. That is, in the mobile terminal of the embodiments of the present disclosure, the shooting mode of the camera module can be determined only by disposing the Hall sensors and the magnetic structural element, the determining logic is simple, and costs are low. Besides, the appearance of the mobile terminal does not need to be additionally modified, and the appearance aesthetics of the mobile terminal can be preserved.

In an exemplary embodiment of the present disclosure, as shown in FIG. 1 to FIG. 3, in the rear-facing shooting mode, the orientation of the camera is contrary to the orientation of the display screen. In the front-facing shooting mode, the orientation of the camera is the same as the orientation of the display screen. The camera module is placed on the placement portion, when the orientation of the camera of the camera module is contrary to the orientation of the display screen of the terminal body, the magnetic structural element is opposite to the first Hall sensor, and when the orientation of the camera is the same as the orientation of the display screen, the magnetic structural element is opposite to the second Hall sensor.

Correspondingly, step 402 may include:

in a case that the first magnetic field strength signal output by the first Hall sensor is a first level signal and the second magnetic field strength signal output by the second Hall sensor is a second level signal, determining that the shooting mode of the camera module is the front-facing shooting mode.

For example, the user can hold the camera module to approach the placement portion of the terminal body. If the orientation of the camera is the same as the orientation of the display screen, the magnetic structural element becomes closer to the second Hall sensor in the process in which the camera module approaches the terminal body, the second Hall sensor detects that the magnetic field strength of the magnetic structural element increases, and when the magnetic field strength reaches a field strength triggering threshold of the second Hall sensor, the second magnetic field strength signal INT2 output by the second Hall sensor changes from the first level signal to a second level signal. In this case, the first Hall sensor detects that the magnetic field strength of the magnetic structural element is small, and the outputted first magnetic field strength signal INT1 is still the first level signal.

In a case that the first magnetic field strength signal output by the first Hall sensor is a second level signal and the second magnetic field strength signal output by the second Hall sensor is a first level signal, it is determined that the shooting mode of the camera module is the rear-facing shooting mode;

For example, the user can hold the camera module to approach the placement portion of the terminal body. If the orientation of the camera is contrary to the orientation of the display screen, the magnetic structural element becomes closer to the first Hall sensor in the process in which the camera module approaches the terminal body, the first Hall sensor detects that the magnetic field strength of the magnetic structural element increases, and when the magnetic field strength reaches a field strength triggering threshold of the first Hall sensor, the first magnetic field strength signal INT1 output by the first Hall sensor changes from the first level signal to a second level signal. In this case, the second Hall sensor detects that the magnetic field strength of the magnetic structural element is small, and the outputted second magnetic field strength signal INT2 is still the first level signal.

The first level signal and the second level signal are different level signals, when the first level signal is a high level signal, the second level signal is a low level signal, or when the first level signal is a low level signal, the second level signal is a high level signal.

In the embodiments of the present disclosure, the shooting mode of the camera module is determined only based on the first magnetic field strength signal output by the first Hall sensor and the second magnetic field strength signal output by the second Hall sensor, the determining logic is simple, and costs are low. Besides, the appearance of the mobile terminal does not need to be additionally modified, and the appearance aesthetics of the mobile terminal can be preserved.

Figure 5:
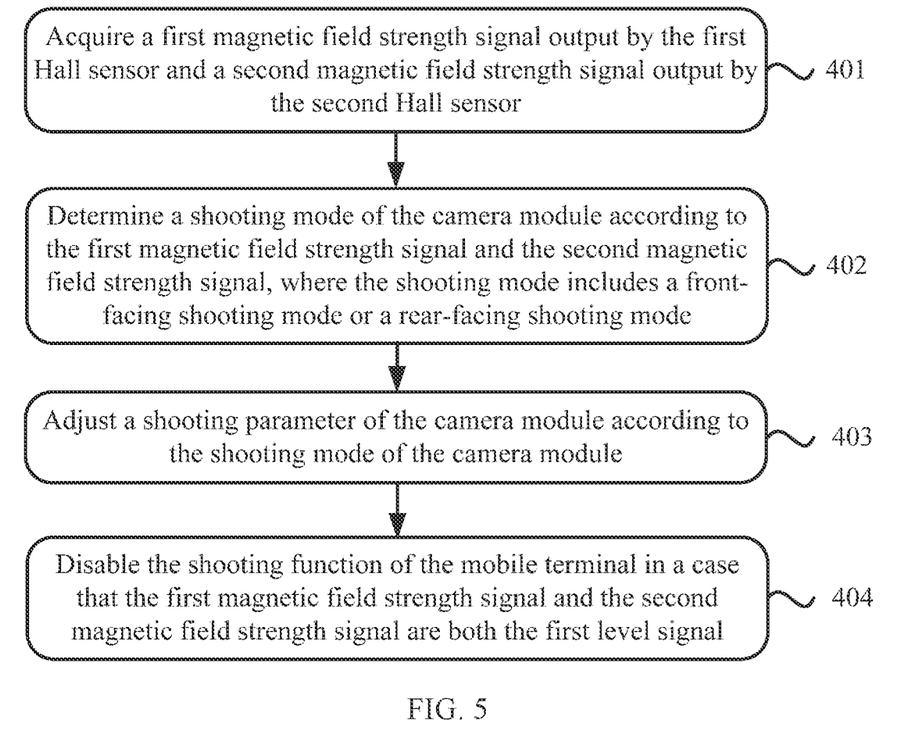
FIG. 5 is a flowchart of another shooting mode detection method according to an embodiment of the present disclosure.

As shown in FIG. 5, in another embodiment of the present disclosure, in a shooting mode detection method provided by an embodiment of the present disclosure, after the above step 402, the method further includes:

Step 403: Adjust a shooting parameter of the camera module according to the shooting mode of the camera module.

The shooting parameter may, for example, include but is not limited to at least one of the following: a shooting speed, a resolution, a focal length, an angle of view, and the like.

It can be understood that the shooting parameter of the camera module is adjusted based on the shooting mode of the camera module, which can improve the shooting quality and shooting efficiency of the camera module in the corresponding shooting mode.

As shown in FIG. 5, in another embodiment of the present disclosure, in a shooting mode detection method provided by the embodiments of the present disclosure, after the above step 402, the method further includes:

Step 404: Disable the shooting function of the mobile terminal in a case that the first magnetic field strength signal and the second magnetic field strength signal are both the first level signal.

It can be understood that when obtaining that the first magnetic field strength signal output by the first Hall sensor and the second magnetic field strength signal output by the second Hall sensor are both the first level signal, it can be determined that the camera module is detached from the terminal body. In this case, by disabling the shooting function of the mobile terminal, power consumption and system resource occupation of the mobile terminal caused by the camera module can be reduced, and the battery life of the mobile terminal can be increased.

It should be noted that, since the method embodiment is basically similar to the mobile terminal described in the above-mentioned embodiments, the method embodiment is only briefly described herein, and for the relevant part, refer to the description of the above-mentioned embodiments.

Figure 6:
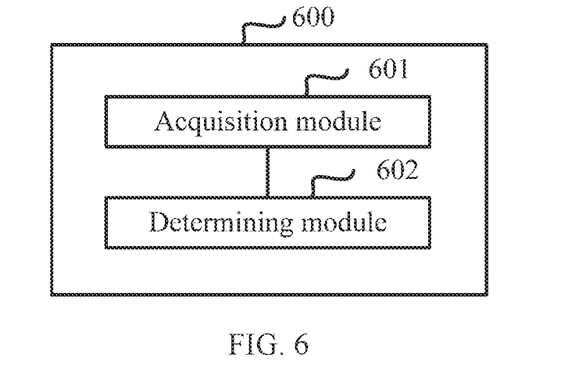
FIG. 6 is a block diagram of a mobile terminal according to an embodiment of the present disclosure.

Referring to FIG. 6, an embodiment of the present disclosure further provides a mobile terminal. Specifically, the mobile terminal may include, but is not limited to, any one of a mobile phone, a tablet computer, a smart wearable device, and a Personal Digital Assistant (PDA). The mobile terminal 600 may include an acquisition module 601 and a determining module 602.

The acquisition module 601 is configured to acquire a first magnetic field strength signal output by the first Hall sensor and a second magnetic field strength signal output by the second Hall sensor.

The determining module 602 is configured to determine a shooting mode of the camera module according to the first magnetic field strength signal and the second magnetic field strength signal, where the shooting mode includes a front-facing shooting mode or a rear-facing shooting mode.

The mobile terminal provided in the embodiments of the present disclosure can implement the processes implemented by the mobile terminal in the method embodiments in FIG. 4 and FIG. 5. To avoid repetition, details are not described herein again.

In the embodiments of the present disclosure, since the magnetic structural element is disposed on the camera module that is detachable from the terminal body, and is opposite to only one of the Hall sensors when the camera module is placed on the placement portion, when the camera module is placed on the placement portion of the terminal body in different manners, Hall sensors opposite to the magnetic structural element are different. Therefore, magnetic field strengths of the magnetic structural element detected by the first Hall sensor and the second Hall sensor are different. Thus, in practical applications, the magnetic field strengths detected by the first Hall sensor and the second Hall sensor can be used to determine the Hall sensor opposite to the magnetic structural element. Since the camera module has a front-facing shooting mode and a rear-facing shooting mode, and the Hall sensors opposite to the magnetic structural element are different in different shooting modes, the processor built in the terminal body can determine the shooting mode of the camera module based on magnetic field strength signals output by the first Hall sensor and the second Hall sensor. That is, in the mobile terminal of the embodiments of the present disclosure, the shooting mode of the camera module can be determined only by disposing the Hall sensors and the magnetic structural element, the determining logic is simple, and costs are low. Besides, the appearance of the mobile terminal does not need to be additionally modified, and the appearance aesthetics of the mobile terminal can be preserved.

In some embodiments, the camera module is placed on the placement portion, when the orientation of the camera of the camera module is contrary to the orientation of the display screen of the terminal body, the magnetic structural element is opposite to the first Hall sensor, and when the orientation of the camera is the same as the orientation of the display screen, the magnetic structural element is opposite to the second Hall sensor; and The determining module 602 is specifically configured to:

in a case that the first magnetic field strength signal is a first level signal and the second magnetic field strength signal is a second level signal, determine that the shooting mode of the camera module is the front-facing shooting mode; and in a case that the first magnetic field strength signal is a second level signal and the second magnetic field strength signal is a first level signal, determine that the shooting mode of the camera module is the rear-facing shooting mode;

where when the first level signal is a high level signal, the second level signal is a low level signal, or when the first level signal is a low level signal, the second level signal is a high level signal.

In the embodiments of the present disclosure, the shooting mode of the camera module is determined only based on the first magnetic field strength signal output by the first Hall sensor and the second magnetic field strength signal output by the second Hall sensor, the determining logic is simple, and costs are low. Besides, the appearance of the mobile terminal does not need to be additionally modified, and the appearance aesthetics of the mobile terminal can be preserved.

In another embodiment of the present disclosure, the apparatus 600 further includes:

an adjustment module, configured to adjust a shooting parameter of the camera module according to the shooting mode of the camera module, where the shooting parameter includes at least one of the following: a shooting speed, a resolution, a focal length, and an angle of view.

It can be understood that the shooting parameter of the camera module is adjusted based on the shooting mode of the camera module, which can improve the shooting quality and shooting efficiency of the camera module in the corresponding shooting mode. In another embodiment of the present disclosure, the apparatus 600 further includes:

a disabling module, configured to disable the shooting function of the mobile terminal in a case that the first magnetic field strength signal and the second magnetic field strength signal are both the first level signal.

It can be understood that when obtaining that the first magnetic field strength signal output by the first Hall sensor and the second magnetic field strength signal output by the second Hall sensor are both the first level signal, it can be determined that the camera module is detached from the terminal body. In this case, by disabling the shooting function of the mobile terminal, power consumption and system resource occupation of the mobile terminal caused by the camera module can be reduced, and the battery life of the mobile terminal can be increased.

In the mobile terminal in the above-mentioned embodiments, a specific manner in which each module performs an operation has been described in detail in the embodiments of the method, and will not be described in detail herein.

Figure 7:
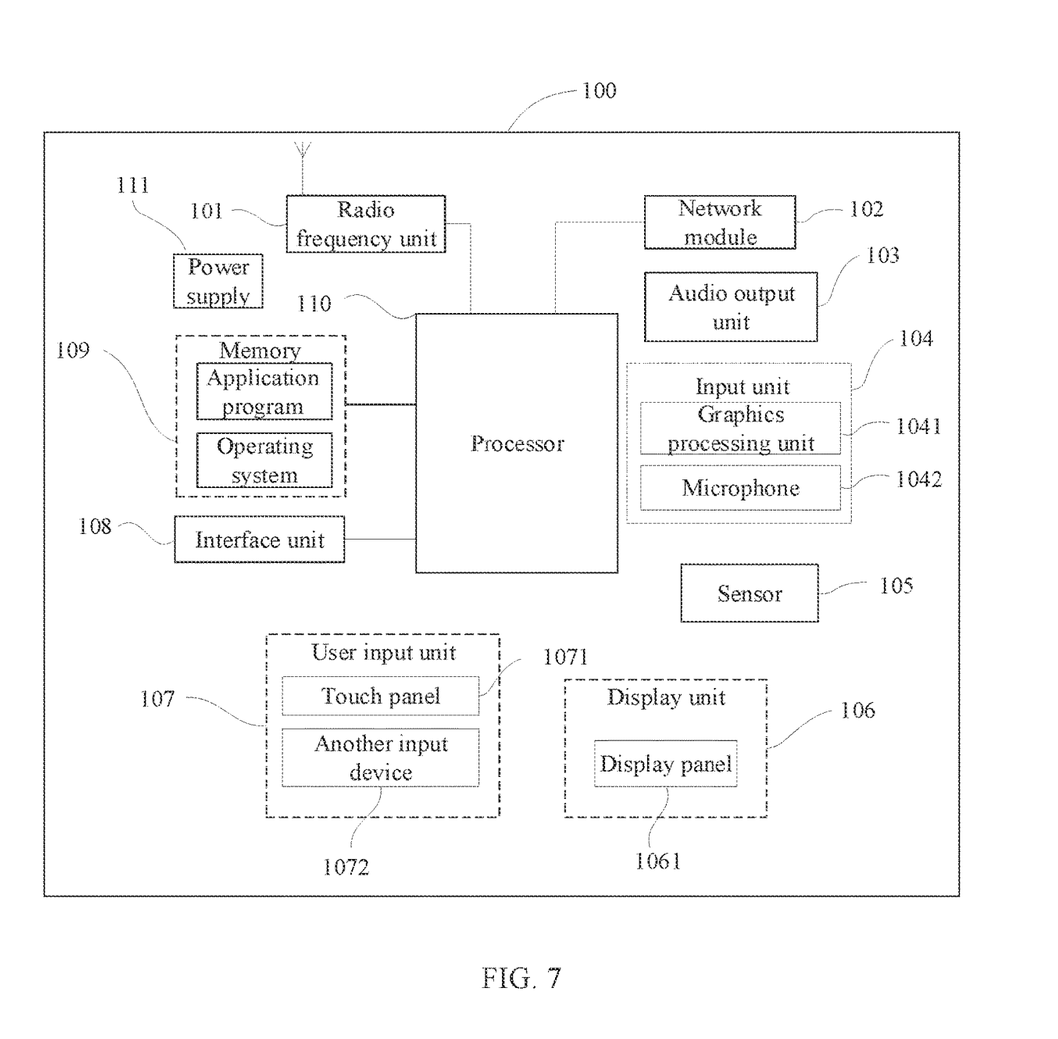
FIG. 7 is a schematic diagram of a hardware structure of a mobile terminal according to an embodiment of the present disclosure.

FIG. 7 is a schematic diagram of a hardware structure of a mobile terminal implementing embodiments of the present disclosure. The mobile terminal 100 includes the terminal body, the camera module detachably connected to the terminal body, the first Hall sensor, the second Hall sensor, and the magnetic structural element according to any one of the above embodiments of the present disclosure. The mobile terminal 100 further includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. These modules or units can be built in the terminal body. A person skilled in the art may understand that a structure of the mobile terminal shown in FIG. 7 does not constitute a limitation on the mobile terminal, and the mobile terminal may include more or fewer components than those shown in the figure, or combine some components, or have different component arrangements. In the embodiments of the present disclosure, the mobile terminal includes but is not limited to a mobile phone, a tablet computer, a laptop computer, a palmtop computer, an in-vehicle terminal, a wearable device, a pedometer, and the like.

The processor 110 is configured to acquire a first magnetic field strength signal output by the first Hall sensor and a second magnetic field strength signal output by the second Hall sensor; and determine a shooting mode of the camera module according to the first magnetic field strength signal and the second magnetic field strength signal, where the shooting mode includes a front-facing shooting mode or a rear-facing shooting mode.

Since the magnetic structural element is disposed on the camera module that is detachable from the terminal body, and is opposite to only one of the Hall sensors when the camera module is placed on the placement portion, when the camera module is placed on the placement portion of the terminal body in different manners, Hall sensors opposite to the magnetic structural element are different. Therefore, magnetic field strengths of the magnetic structural element detected by the first Hall sensor and the second Hall sensor are different. Thus, in practical applications, the magnetic field strengths detected by the first Hall sensor and the second Hall sensor can be used to determine the Hall sensor opposite to the magnetic structural element. Since the camera module has a front-facing shooting mode and a rear-facing shooting mode, and the Hall sensors opposite to the magnetic structural element are different in different shooting modes, the processor built in the terminal body can determine the shooting mode of the camera module based on magnetic field strength signals output by the first Hall sensor and the second Hall sensor. That is, in the mobile terminal of the embodiments of the present disclosure, the shooting mode of the camera module can be determined only by disposing the Hall sensors and the magnetic structural element, the determining logic is simple, and costs are low. Besides, the appearance of the mobile terminal does not need to be additionally modified, and the appearance aesthetics of the mobile terminal can be preserved.

It should be understood that in the embodiments of the present disclosure, the radio frequency unit 101 may be configured to receive and transmit information, or receive and transmit signals during a call. Specifically, the radio frequency unit 101 receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may also communicate with a network and other devices through a wireless communication system.

The mobile terminal provides wireless broadband Internet access for a user by using a network module 102, for example, helping the user send and receive an email, browsing a web page, and accessing streaming media.

The audio output unit 103 can convert audio data received by the radio frequency unit 101 or the network module 102 or stored in the memory 109 into an audio signal, and output the audio signal as sound. In addition, the audio output unit 103 may further provide audio output (for example, call signal receiving sound or message receiving sound) to a specific function performed by the mobile terminal 100. The audio output unit 103 includes a speaker, a buzzer, a telephone receiver, and the like.

The input unit 104 is configured to receive audio or radio frequency signals. The input unit 104 may include a Graphics Processing Unit (GPU) 1041 and a microphone 1042. The graphics processing unit 1041 is configured to process image data of a static picture or a video obtained by an image capture apparatus (for example, a camera) in video capture mode or image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and can process the sound into audio data. Processed audio data may be converted, in a call mode, into a format that can be sent to a mobile communication base station by using the radio frequency unit 101 for output.

The mobile terminal 100 further includes at least one sensor 105, such as an optical sensor, a motion sensor, and another sensor. Specifically, the optical sensor includes an ambient light sensor and a proximity sensor. The ambient light sensor may adjust luminance of the display panel 1061 based on brightness of ambient light, and the proximity sensor may disable the display panel 1061 and/or backlight when the mobile terminal 100 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a mobile terminal gesture (for example, horizontal and vertical screen switching, a game, or magnetometer posture calibration), a function to vibration recognition (for example, a pedometer or a strike), or the like. The sensor 105 may further include a fingerprint sensor, a pressure sensor, an iris sensor, a molecular sensor, a gyroscope, a barometer, a hygrometer, a thermometer, an infrared sensor, and the like. This is not described herein.

The display unit 106 is configured to display information input by the user or information provided to the user. The display unit 106 may include the display panel 1061, and the display panel 1061 may be configured in a form of a Liquid Crystal Display (LCD), an Organic Light-Emitting Diode (OLED), or the like.

The user input unit 107 may be configured to receive input digit or character information and generate key signal input to user setting and function control of the mobile terminal. Specifically, the user input unit 107 includes a touch panel 1071 and another input device 1072. The touch panel 1071 is also referred to as a touchscreen, and may collect a touch operation of the user on or near the touch panel 1071 (for example, an operation performed on or near the touch panel 1071 by the user by using any appropriate object or accessory such as a finger or a stylus). The touch panel 1071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 110, and can receive and execute a command sent by the processor 110. In addition, the touch panel 1071 may be implemented as a resistive type, a capacitive type, an infrared type, a surface acoustic wave type, or the like. In addition to the touch panel 1071, the user input unit 107 may further include another input device 1072. Specifically, the another input device 1072 may include but is not limited to: a physical keyboard, a function button (such as a volume control button, a switch button), a trackball, a mouse, and a joystick, which is not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. In FIG. 7, the touch panel 1071 and the display panel 1061 are used as two independent components to implement input and output functions of the mobile terminal. However, in some embodiments, the touch panel 1071 and the display panel 1061 may be integrated to implement the input and output functions of the mobile terminal. This is not specifically limited herein.

The interface unit 108 is an interface connecting an external apparatus to the mobile terminal 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, an earphone port, and the like. The interface unit 108 may be configured to receive input (for example, data information and power) from the external apparatus and transmit the received input to one or more elements in the mobile terminal 100, or may be configured to transmit data between the mobile terminal 100 and the external apparatus.

The memory 109 may be configured to store a software program and various pieces of data. The memory 109 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 109 may include a high-speed random access memory or a nonvolatile memory, for example, at least one disk storage device, a flash memory, or other nonvolatile solid-state storage devices.

The processor 110 is a control center of the mobile terminal, and is connected to all parts of the entire mobile terminal by using various interfaces and lines, and performs various functions of the mobile terminal and processes data by running or executing the software program and/or the module that are stored in the memory 109 and invoking the data stored in the memory 109, to implement overall monitoring on the mobile terminal. The processor 110 may include one or more processing units. In some embodiments, the processor 110 may integrate an application processor and a modem processor. The application processor mainly deals with an operating system, a user interface, an application, and the like. The modem processor mainly deals with wireless communication. It can be understood that, alternatively, the modem processor may not be integrated into the processor 110.

The terminal 100 may also include the power supply 111 (for example, a battery) that supplies power to various components. In some embodiments, the power supply 111 may be logically connected to the processor 110 by using a power supply management system, to implement functions of managing charging, discharging, and power consumption by using the power supply management system.

In addition, the mobile terminal 100 includes some function modules not shown, and details are not described herein.

In some embodiments, an embodiment of the present disclosure further provides a mobile terminal, including a processor 110, a memory 109, and a computer program stored in the memory 109 and executable on the processor 110. When executed by the processor 110, the computer program implements the foregoing processes of the embodiments of the shooting mode detection method, and a same technical effect can be achieved. To avoid repetition, details are not described herein again.

Embodiments of the present disclosure further provide a computer readable storage medium. The computer readable storage medium stores a computer program. The computer program implements, when executed by a processor, the foregoing processes of the embodiments of the shooting mode detection method, and a same technical effect can be achieved. To avoid repetition, details are not described herein again. The computer readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the descriptions of the foregoing implementations, a person skilled in the art may clearly understand that the method in the foregoing embodiments may be implemented by software in addition to a necessary universal hardware platform or by hardware only. In most circumstances, the former is an exemplary implementation. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A mobile terminal, comprising:
   a terminal body, wherein the terminal body has a placement portion for placing a camera module;
   the camera module detachably connected to the terminal body;
   a first Hall sensor and a second Hall sensor, wherein the first Hall sensor and the second Hall sensor are respectively electrically connected to a processor built in the terminal body and fixedly arranged on a side on which the placement portion of the terminal body is located, wherein the processor is configured to adjust a shooting parameter of the camera module based on magnetic field strength signals output by the first Hall sensor and the second Hall sensor; and a magnetic structural element, wherein the magnetic structural element is fixed on an end of the camera module close to the placement portion, and when the camera module is placed on the placement portion, the magnetic structural element is opposite to the first Hall sensor or the second Hall sensor, wherein:
the terminal body comprises a display screen, and the camera module comprises a camera; and the camera module has a front-facing shooting mode and a rear-facing shooting mode, wherein in the front-facing shooting mode, the orientation of the camera is the same as the orientation of the display screen, and in the rear-facing shooting mode, the orientation of the camera is contrary to the orientation of the display screen, wherein the processor is configured to:
acquire a first magnetic field strength signal output by the first Hall sensor and a second magnetic field strength signal output by the second Hall sensor; and determine a shooting mode of the camera module according to the first magnetic field strength signal and the second magnetic field strength signal wherein:
the camera module is placed on the placement portion;
when the orientation of the camera is contrary to the orientation of the display screen, the magnetic structural element is opposite to the first Hall sensor;
when the orientation of the camera is the same as the orientation of the display screen, the magnetic structural element is opposite to the second Hall sensor, and
the processor is configured to:
when the first magnetic field strength signal is a first level signal and the second magnetic field strength signal is a second level signal, determine that the shooting mode of the camera module is the front-facing shooting mode; and
when the first magnetic field strength signal is a second level signal and the second magnetic field strength signal is a first level signal, determine that the shooting mode of the camera module is the rear-facing shooting mode,
wherein when the first level signal is a high level signal, the second level signal is a low level signal, or when the first level signal is a low level signal, the second level signal is a high level signal.

2. The mobile terminal according to claim 1, wherein the first Hall sensor and the second Hall sensor are symmetrically distributed on two sides relative to the center line of the terminal body.

3. The mobile terminal according to claim 1, wherein the processor is further configured to disable the shooting function of the mobile terminal when the first magnetic field strength signal and the second magnetic field strength signal are both the first level signal.

4. The mobile terminal according to claim 1, wherein the processor is further configured to adjust the shooting parameter of the camera module according to the shooting mode, wherein the shooting parameter comprises at least one of the following: a shooting speed, a resolution, a focal length, or an angle of view.

5. A shooting mode detection method, performed by a mobile terminal, comprising: acquiring a first magnetic field strength signal output by a first Hall sensor and a second magnetic field strength signal output by a second Hall sensor, wherein the first Hall sensor and the second Hall sensor are respectively electrically connected to a processor built in a terminal body of the mobile terminal and fixedly arranged on a side of the terminal body on which a placement portion for placing a camera module is located;

adjusting a shooting parameter of the camera module based on first magnetic field strength signal output by the first Hall sensor and the second magnetic field strength signal output by the second Hall sensor; and determining a shooting mode of the camera module according to the first magnetic field strength signal and the second magnetic field strength signal, wherein the shooting mode comprises a front-facing shooting mode or a rear-facing shooting mode, wherein the camera module is placed on the placement portion and a magnetic structural element fixed on an end of the camera module close to the placement portion, wherein when the orientation of the camera of the camera module is contrary to the orientation of the display screen of the terminal body, the magnetic structural element is opposite to the first Hall sensor, and when the orientation of the camera is the same as the orientation of the display screen the magnetic structural element is opposite to the second Hall sensor, and wherein the determining a shooting mode of the camera module according to the first magnetic field strength signal and the second magnetic field strength signal comprises;

when the first magnetic field strength signal is a first level signal and the second magnetic field strength signal is a second level signal, determining that the shooting mode of the camera module is the front-facing shooting mode; and when the first magnetic field strength signal is a second level signal and the second magnetic field strength signal is a first level signal, determining that the shooting mode of the camera module is the rear-facing shooting mode, wherein when the first level signal is a high level signal, the second level signal is a low level signal, or when the first level signal is a low level signal, the second level signal is a high level signal.

6. The shooting mode detection method according to claim 5, further comprising:
disabling the shooting function of the mobile terminal when the first magnetic field strength signal and the second magnetic field strength signal are both the first level signal.

7. The shooting mode detection method according to claim 5, further comprising:
adjusting a shooting parameter of the camera module according to the shooting mode of the camera module;
wherein the shooting parameter comprises at least one of the following: a shooting speed, a resolution, a focal length, or an angle of view.

8. An electronic device, comprising: a processor built in a terminal body of a mobile terminal, and a memory having a computer program stored therein, wherein the computer program, when executed by the processor, causes the processor to perform a shooting mode detection method, comprising:

acquiring a first magnetic field strength signal output by a first Hall sensor and a second magnetic field strength signal output by a second Hall sensor, wherein the first Hall sensor and the second Hall sensor are respectively electrically connected to the processor and fixedly arranged on a side of the terminal body on which a placement portion for placing a camera module is located;

adjusting a shooting parameter of the camera module based on first magnetic field strength signal output by the first Hall sensor and the second magnetic field strength signal output by the second Hall sensor; and determining a shooting mode of the camera module according to the first magnetic field strength signal and the second magnetic field strength signal, wherein the shooting mode comprises a front-facing shooting mode or a rear-facing shooting mode, wherein the camera module is placed on the placement portion and a magnetic structural element fixed on an end of the camera module close to the placement portion, wherein when the orientation of the camera of the camera module is contrary to the orientation of the display screen of the terminal body, the magnetic structural element is opposite to the first Hall sensor, and when the orientation of the camera is the same as the orientation of the display screen, the magnetic structural element is opposite to the second Hall sensor, and wherein the shooting mode detection method further comprises:

when the first magnetic field strength signal is a first level signal and the second magnetic field strength signal is a second level signal determining that the shooting mode of the camera module is the front-facing shooting mode; and when the first magnetic field strength signal is a second level signal and the second magnetic field strength signal is a first level signal, determining that the shooting mode of the camera module is the rear-facing shooting mode, wherein when the first level signal is a high level signal, the second level signal is a low level signal or when the first level signal is a low level signal, the second level signal is a high level signal.

9. The electronic device according to claim 8, wherein the shooting mode detection method further comprises:

disabling the shooting function of the mobile terminal when the first magnetic field strength signal and the second magnetic field strength signal are both the first level signal.

10. The electronic device according to claim 8, wherein the shooting mode detection method further comprises:

adjusting a shooting parameter of the camera module according to the shooting mode of the camera module;

wherein the shooting parameter comprises at least one of the following: a shooting speed, a resolution, a focal length, or an angle of view.

* * * * *